United States Patent [19]

Ando et al.

[11] Patent Number: 5,993,701
[45] Date of Patent: Nov. 30, 1999

[54] THIRD-ORDER NONLINEAR OPTICAL MATERIAL AND METHOD FOR PRODUCTION THEREOF

[75] Inventors: Masanori Ando; Toru Sakaguchi; Tetsuhiko Kobayashi, all of Osaka; Seiichi Teshima; Yoshinobu Asako, both of Ibaraki, all of Japan

[73] Assignee: Industrial Science & Technology, Tokyo, Japan

[21] Appl. No.: 08/979,280

[22] Filed: Nov. 26, 1997

[30] Foreign Application Priority Data

Nov. 27, 1996 [JP] Japan .................................. 8-316706
Nov. 27, 1996 [JP] Japan .................................. 8-316707
Nov. 27, 1996 [JP] Japan .................................. 8-316708

[51] Int. Cl.$^6$ .............................. F21V 9/00; G02F 1/35
[52] U.S. Cl. .......................................... 252/582; 359/329
[58] Field of Search .................................. 252/582, 600; 359/329

[56] References Cited

U.S. PATENT DOCUMENTS

| | | | |
|---|---|---|---|
| 5,348,687 | 9/1994 | Beck et al. | 252/582 |
| 5,401,569 | 3/1995 | Kineri et al. | 359/329 |
| 5,432,635 | 7/1995 | Tanahashi et al. | 252/582 |
| 5,482,656 | 1/1996 | Hiraoka et al. | 252/514 |
| 5,688,442 | 11/1997 | Ando et al. | 252/582 |
| 5,824,240 | 10/1998 | Sato et al. | 252/582 |

FOREIGN PATENT DOCUMENTS

| | | |
|---|---|---|
| 0 232 138 | 1/1987 | European Pat. Off. . |
| 195 01 802 A1 | 8/1995 | Germany . |
| 195 03 098 A1 | 8/1996 | Germany . |
| 2-44031 | 2/1990 | Japan . |
| 4-189801 | 7/1992 | Japan . |
| 4-212133 | 8/1992 | Japan . |
| 5-127206 | 5/1993 | Japan . |
| 5-184913 | 7/1993 | Japan . |
| 5-224262 | 9/1993 | Japan . |
| 6-167728 | 6/1994 | Japan . |
| 7-248516 | 7/1995 | Japan . |
| 7-270837 | 10/1995 | Japan . |
| WO 90/09884 | 9/1990 | WIPO . |

OTHER PUBLICATIONS

Zhang et al., Proceedings SPIE, vol. 1560, Nonlinear Optical Properties of Organic Materials, pp. 264–271, 1991.

Bloemer et al., "Degenerate four–Wave Mixing in Colloidal Gold as a Function of Particle Size", J. Opt. Soc. Am. B/vol. 7, No. 5/May (1990), pp. 790–795.

Fukumi et al., "Structure of Au Ultafine Particles in Silica Glass: X–ray Diffraction Study", Applied Physics Letters, vol. 64, No. 25, Jun. 20, (1994), pp. 3410–3412.

Hache et al., "The Optical Kerr Effect in Small Metal Particles and Metal Colloids: The Case of Gold", Appl. Phys. A 47, pp. 347–357, (1988).

Jain et al, "Degenerate Four–Wave Mixing in Semiconductor–doped Glasses", J. Opt. Soc. Am., vol. 27, No. 5 May (1983), pp. 647–653.

Kadono et al, "Nonlinear Optical Properties of Au Colloid–Doped Glasses", Mat. Res. Soc. Symp. Proc. vol. 283, pp. 908–908, (1993).

Kadono et al, "Optical Non–linear Property of Au Colloid–doped Glass and the Laser Irradiation Stability", Journal of Materials Science: Materials in Electronics 4(1993)59–61.

*Primary Examiner*—Philip Tucker
*Attorney, Agent, or Firm*—Fish & Richardson P.C.

[57] ABSTRACT

A third-order nonlinear optical material having a metal oxide contained in a transparent polymer.

19 Claims, 1 Drawing Sheet

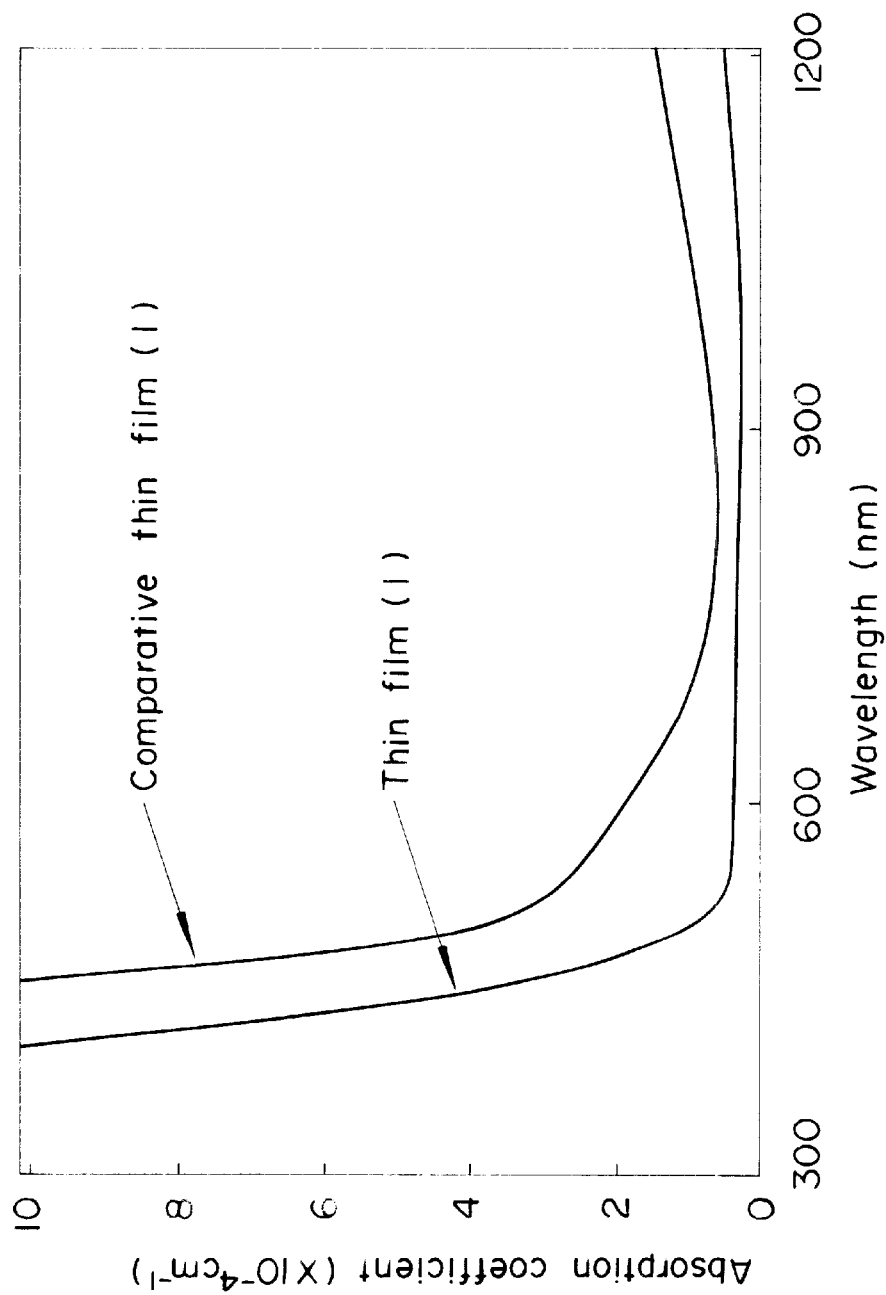

THIRD-ORDER NONLINEAR OPTICAL MATERIAL AND METHOD FOR PRODUCTION THEREOF

BACKGROUND OF THE INVENTION

1. Field of the Invention

This invention relates to a third-order nonlinear optical material excelling in third-order nonlinear optical properties characterized in terms of conversion of wavelength, phenomenon of optical bistability, and generation of phase-conjugated wavefront, and to a method for the production thereof.

2. Description of the Related Art

In recent years, the feasibility of utilizing a second-order nonlinear optical material for such optical devices as, for example, wavelength-converting elements has been under study. Such inorganic crystals as potassium dihydrogen phosphate and lithium niobate have been heretofore used as a second-order nonlinear optical material. Since these substances are used more often than not in the form of single crystals, they are deficient in processability and consequently are not easily fabricated into elements.

The feasibility of using a third-order nonlinear optical material for such optical devices as extremely high-speed optical switches, optical bistable elements, phase-correcting elements, and wavelength-converting elements is being studied. As concerns third-order nonlinear optical materials using fine metal particles such as of gold and silver, semi-conducting nonoxide fine particles such as of CdS, and organic compounds exhibiting a third-order nonlinear optical effect, development of materials which satisfy such high qualities as, for example, (1) high third-order nonlinear susceptibility, (2) high transparency (small absorption) in the operating wavelength range, and (3) high response speed has been under way. The term "response speed" used herein refers to a time required for one operation in the repeated operations with the above optical device. Therefore, the smaller the response speed is, the larger the number of operations per one second can be performed. Since the time until the generated effect is vanished completely (or to such a extent as that the influence by the accumulation of effects can be neglected) is generally longer than that until the effect is manifested, the development for the latter material having a short relaxation time must be important.

As conventional technical achievements in this field, a glass having fine gold particles dispersed therein by the technique of fusion disclosed in Applied Physics A, Vol. 47, p.347 (1988) and a glass having fine gold particles dispersed therein by the technique of ion implantation disclosed in Material Research Society Symposium Proceedings, Vol. 283, p.903 (1993) may be cited. When the technique of fusion is adopted, it is at a disadvantage in limiting the species of metals usable therein by reason of fusibility and also limiting the solubility of a selected metal in glass. Since the third-order nonlinear optical properties of the relevant material are in direct proportion to the concentration of a metal contained in glass, the limitation of the solubility implies the limitation of the third-order nonlinear optical properties of the material. Even when the technique of ion implantation which allows an addition to the concentration of metal is adopted, it is still difficult to enable the glass to contain a metal at a ratio of not less than approximately 6.3 atomic percentage. As stated in Material Research Society Symposium Proceedings, Vol. 283, p.903 (1993), the glass having fine gold particles dispersed therein is observed to contain a slow relaxation component in third-order nonlinear optical effects. According to M. J. Bloemer et al., J. Opt. Soc. Am. B, 7, p.790 (1990), this phenomenon is interpreted as arising from the slow relaxation of lattice vibration of fine gold particles. Further, this technique does not deserve to be called a perfect process because it requires heat-treatment for enabling a metal ion dispersed in glass to be precipitated as the fine metal particle and consequently complicates the process.

As mentioned above, in the case of glass having fine gold particles dispersed therein as a conductive material, it is difficult to increase the concentration of the metal and consequently the heat-treatment at an elevated temperature is needed. As stated in Applied Physics Letter, Vol. 64, No. 25, p.20 (1994), there is a problem in disorder of interface because of difference in coefficient of thermal expansion between glass matrix and fine gold particle.

In J. Opt. Soc. Am., 73, p.647 (1983), it has been proposed to use a cutoff filter having fine particles of $CdS_xSe_{1-x}$ dispersed in borosilicate glass as a third-order nonlinear optical thin film. This cutoff filter glass is manufactured by placing the raw materials for borosilicate glass and $CdS_xSe_{1-x}$ in a platinum crucible and fusing them at a temperature of about 1000° C. This manufacture, however, entails the problem that a part of semiconductor components is vaporized with variation of composition during the course of the fusion. Further, as stated in Journal of Materials Science: Materials in Electronics, 4 (1993), pp.59–61, the fine semiconducting particles such as of CdS are subjected to degradation of the third-order nonlinear optical effect and induction of the phenomenon of blackening and have dubious stability as evinced by precipitation of sulfur due to oxidative decomposition. Further, the filter glass warrants no perfect safety because it contains cadmium, a substance harmful to a human body, and the process used for the production thereof hardly deserves to be called satisfactory in terms of processability because it requires the raw materials to be fused at an elevated temperature.

On the other hand, techniques which comprise dispersing fine CdS particles in a polymer in order to avoid harmful effects generated by the heat-treatment at an elevated temperature have been disclosed in JP-A-04-189801 and JP-A-05-184913. In these publications, techniques which comprise forming CdS by the light irradiation to obtain CdS particles having its surface coated with a polymer, and forming the particles into a film have been disclosed.

These publications, however, have defects in that the stability of these fine particles is degraded with the elapse of time because of easy oxidative decomposition of CdS itself.

In the dispersions of these fine particles, the conducting particles of gold or the semiconducting particles of CdS which are dispersed in an insulating medium can be expected to manifest prominent third-order nonlinear optical properties, ultraradiation of excitons, and specificity of crystal interface reaction by the fact that electrons and positive holes, or excitons are confined three-dimensionally. In order to ensure thorough derivation of this quantum size effect, the fine particles dispersed are required to possess a size small enough to manifest the quantum size effect, i.e., a size of not more than 500 nm, preferably not more than 100 nm, exhibit a narrow particle diameter distribution, and assume the best possible state of dispersion.

Further, Nature, Vol. 374, No. 6523, pp.625–627 discloses that an oxide thin film which is formed by the thermal decomposition of alkyl carboxylate of V, Cr, Mn, Fe, Co, Cu, and Ni can manifest large third-order nonlinear optical effects.

As stated in JP-A-07-284516, a thin film formed of an oxide of a transition metal selected from the group consisting of V, Cr, Mn, Fe, Co, Ni, and Cu and containing an additive component selected from the group consisting of $Al_2O_3$, ZnO, and $ZrO_2$ has been proposed. The manufacture of this thin film can hardly be called easy because it necessitates a heat treatment at an elevated temperature in spite of the addition of $Al_2O_3$, ZnO, or $ZrO_2$. Further, the additive component is only effective in improving the thin film instructural stability and mechanical strength and is not particularly effective in enhancing the third-order nonlinear optical property of the thin film.

Polymer, Vol. 34, No. 6 (1993), pp.1174–1178 discloses such data as the structures and the characteristics (such as third-order nonlinear susceptibility coefficient) of a poly(p-phenylenevinylene) (PPV)/silica composite and a PPV/$V_2O_5$ composite. The section "INTRODUCTION" of the literature has a mention to the effect that when the PPV, a substance which inherently manifests a third-order nonlinear optical effect, incorporates silica or $V_2O_5$ therein, it enjoys an improvement in the third-order nonlinear optical effect thereof. It, however, has absolutely no mention of the fact that silica or $V_2O_5$ itself manifests a third-order nonlinear optical effect. Further, the PPV itself is deficient in manufacture of a film because it is insoluble and infusible. PPV, therefore, must be obtained by previously forming a film using a water-soluble sulfonate thereof as the precursor and thermally decomposing the film.

This invention aims to solve the problems of processability attendant on the conventional techniques and also improve the speed of relaxation. To be specific, it aims to provide a material which excels in processability and has a higher relaxation speed as compared with the conventional material by introducing an oxide of a transition metal into a transparent polymer.

An object of this invention, therefore, is to provide a novel third-order nonlinear optical material and a method for the production thereof.

A further object of this invention is to provide a third-order nonlinear optical material satisfying the requirements, i.e. (1) large third-order nonlinear susceptibility; (2) high transparency (small absorption) in the operating wavelength range; and (3) high relaxation speed, and being excellent in weatherability to withstand the deterioration with the elapse of time such as due to the decomposition through oxidation, heat resistance to withstand the thermal deterioration such as the alteration of composition, chemical and thermal stability (lightfastness) to withstand the laser beam, safety to a human body, and processability manifested during the course of manufacture.

Another object of this invention is to provide a third-order nonlinear optical material which is capable of fully manifesting a quantum size effect.

Still another object of this invention is to provide a third-order nonlinear optical material which abounds in species of substances usable (or fit for arbitrary selection) for raw material components, prevents restrictions on manufacture from affecting the properties of raw materials, and enjoys high relaxation speed.

Yet another object of this invention is to provide a method for the production of a third-order nonlinear optical material which satisfies the objects mentioned above and requires no complicate treatment or process, avoids necessity of such a heat treatment as by heating at an elevated temperature or fusion, and excels in processability.

SUMMARY OF THE INVENTION

The objects mentioned above are accomplished by a third-order nonlinear optical material having a metal oxide contained in a transparent polymer.

The third-order nonlinear optical material of this invention is characterized, as described above, by having a metal oxide contained in a transparent polymer. The third-order nonlinear optical material according to this invention satisfies the requirements, i.e. (1) high third-order nonlinear susceptibility; (2) high transparency (low absorption) in the operating wavelength range; and (3) extremely rapid relaxation speed, and excels in weatherability to withstand the deterioration with the elapse of time such as due to the decomposition through oxidation, heat resistance to withstand the thermal deterioration such as the alteration of composition, chemical and thermal stability (lightfastness) to withstand the laser beam, safety to a human body, and processability manifested during the course of manufacture. The third-order nonlinear optical material, therefore, can be extensively utilized for such optical devices as extremely high-speed optical switches, optical bistable elements, phase-correcting elements, and wavelength-converting elements.

BRIEF DESCRIPTION OF THE DRAWINGS

FIG. 1 shows an ultraviolet-visible absorption spectrum of a thin film (1) as a third-order nonlinear optical material in Example 1 of this invention and a comparative thin film (1) in Referential Example 2.

DESCRIPTION OF THE PREFERRED EMBODIMENT

The third-order nonlinear optical material according to this invention is produced by introducing a metal oxide in a transparent polymer.

The metal oxide to be used in this invention is only required to have an absorption at a wavelength of not less than 248 nm, preferably not less than 350 nm, and more preferably not less than 500 nm and manifest a third-order nonlinear optical effect on exposure to a laser beam. It is inferred that the metal oxide which has the absorption at the wavelength mentioned above and manifests the third-order nonlinear optical effect on exposure to a laser beam manifests the third-order nonlinear optical effect owing to the so-called band-filling phenomenon which consists in prominently increasing the carrier density in the excited state in consequence of the irradiation of a laser beam near the band gap and consequently inducing saturated absorption and a change in refractive index. Since it suffices to select the wavelength of the laser in compliance with the size of the band gap, it may well be concluded that this invention enjoys a very rich variety of species of metal oxides to be usable. When a given metal oxide has an absorption only at a wavelength of less than 248 nm, it is inappropriate for this invention because the operating wavelength of the laser beam for enabling this metal oxide to manifest the third-order nonlinear optical effect is less than 248 nm and the laser beam is absorbed by the polymer. For the purpose of decreasing the absorption of the laser beam by the polymer and preventing the laser beam from impairing the polymer, it is advantageous to adopt a metal oxide having an absorption at a wavelength of not less than 350 nm and operate the laser beam at a wavelength of not less than 350 nm.

The metal oxide does not need to be particularly limited by the kind but is only required to have an absorption at a wavelength of not less than 248 nm. It is preferably a metal oxide having a d electron, more preferably an oxide of a metal containing any of the transition metal elements of Groups IIIa, IVa, Va, VIa, VIIa, VIII, Ib and IIb of the 4th to 6th period in the Periodic Table of the Elements, and still more preferably an oxide of at least one transition metal selected from the group consisting of such transition metal elements of the 4th period in the Periodic Table of the Elements as Sc, Ti, V, Cr, Mn, Fe, Co, Ni, and Cu which exhibit a large third-order nonlinear optical effect.

The metal oxides mentioned above impose no particular restriction on the state of oxidation of the relevant metal. As typical examples thereof, one member or a mixture of two or more members selected from the group consisting of $Cr_2O_3$, $MnO_2$, $MnO_4$, $Fe_2O_3$, $Fe_3O_4$, $CoO$, $Co_2O_3$, $Co_3O_4$, $CuO$, $NiO$, $V_2O_5$, and $VO_2$ may be cited. Alternatively, a composite oxide may be used as the metal oxide. As such a composite oxide, composite oxides of an element like V with an element like Nb and Ta both of which elements are of the same family and form oxides of a similar crystal structure, composite oxides of an element like V with an element like Co and Cu both of which elements exhibit large third-order nonlinear optical effects, and composite oxides of an element(s) like V which exhibits a third-order nonlinear optical effect and an element(s) like zr which makes a relatively small contribution to the third-order nonlinear optical effect for the purpose of improving transparency may be used. As typical examples of the third kind, $MnCo_2O_4$, $NiCo_2O_4$, $NiMnCo_4O_8$, $ZrV_2O_7$, $V_3Zr_3O_7$, $V_3Ti_6O_{17}$, and $Zn_3V_3O_8$ may be cited. Further, the composite oxide may contain therein a part (phase) having individual oxides separated from each other. Furthermore, as the metal oxides which may be used in this invention, the hydrated vanadium oxides like $V_2O_5.H_2O$ and $VO_2.H_2O$ may be used.

The metal oxide to be used in this invention is enabled to manifest a quantum size effect and enhance oscillator strength and third-order nonlinear susceptibility because this metal oxide is uniformly dispersed in the form of fine particles in a polymer. The absorption forms a sharp leading edge and the absorption spectrum produces a blue shift owing to the fact that the quantum size effect is manifested. It is further inferred that the relaxation speed is heightened because the use of a laser beam in the proximity of the absorption edge enables the third-order nonlinear optical effect to be manifested with the smallest possible absorption of light. By the reasons adduced above, the metal oxide is morphologically preferred to be small in size, preferably in the form of fine particles having a particle diameter of not more than 1 μm, more preferably not more than 500 nm, and most preferably not more than 100 nm.

The method for the production of the metal oxide to be used in this invention imposes no particular restriction. As typical examples of the method which is effectively used herein, methods for decomposing a metal salt of organic acid, a metal alkoxide or a metal nitrate, vapor-phase chemical deposition methods such as by an electric furnace method which is disclosed in "Particulates Handbook (Fuji Techno System)", a chemical furnace method, a plasma method, a laser method, and a high voltage pulse discharge method, vapor-phase physical deposition methods such as by a sputter deposition method, a vacuum evaporation method, a resistance heating method, a high frequency induction method, a plasma method, an electron beam heating method, and a laser beam heating method, chemical liquid-phase methods such as by a co-precipitation method, a homogeneous precipitation method, a chemical precipitation method, a metal alkoxide method, and a hydrothermal method, physical liquid-phase methods such as by a spray method, a solution combustion method, a freeze-drying method, an emulsion-drying method, and a nitrate decomposition method, solid-phase methods such as by a jet method, a hammer method, a mill method, and a classifying method, and a solid-solid phase crystallizing method may be cited. Among other methods cited above, a chemical liquid-phase method, a sputter deposition method, a vacuum evaporation method, a laser beam heating method, and a method for thermally decomposing a metal salt of organic acid, a metal alkoxide or a metal nitrate prove to be advantageous in terms of excellence in mass-production and easy control of composition.

The third-order nonlinear optical material of this invention is at an advantage in keeping the composition thereof intact, retaining the interface between the fine particles of the metal oxide and the polymer in good order, and not readily suffering the metal oxide contained in the polymer to have a defect because it renders useless the thermal fusion at a temperature of not less than 1000° C. as be performed in the conventional technique, for example, during the process of manufacture. It also enjoys stability enough to withstand the effect of the laser beam because it uses a chemically stable metal oxide.

As the metal oxide to be used in this invention, a semiconducting metal oxide which has an electric conductivity in the range of $10^{-10}$ to $10^3$ S·cm$^{-1}$, preferably in the range of $10^{-6}$ to $10^3$ S·cm$^{-1}$ may be used, and it is only required to manifest a third-order nonlinear optical effect when exposed to a laser beam. It is inferred that the semiconducting metal oxide manifests a third-order nonlinear optical effect owing to a so-called band-filling phenomenon which consists in notably increasing the carrier density in the excited state in consequence of the irradiation of a laser beam near the band gap and, as a result, inducing saturated absorption and a change in refractive index. Since it consequently suffices to select the wavelength of the laser in compliance with the size of the band gap, it may well be concluded that this invention enjoys a very rich variety of species of metal oxides to be usable.

The semiconducting metal oxide does not need to be limited particularly by these kind but is only required to satisfy the requirements mentioned above. Specifically, it is preferably the semiconducting oxide of a metal having a d electron, more preferably a semiconducting oxide of a metal containing any of the transition metal elements of Groups IIIa, IVa, Va, VIa, VIIa, VIII, Ib and IIb of the 4th to 6th period in the Periodic Table of the Elements, and still more preferably a semiconducting oxide of at least one transition metal selected from the group consisting of such transition metal elements of the 4th period in the Periodic Table of the Elements as Sc, Ti, V, Cr, Mn, Fe, Co, Ni, and Cu which exhibit a large third-order nonlinear optical effect.

The semiconducting oxides of metals mentioned above impose no particular restriction on the state of oxidation of the relevant metal. As typical examples of the semiconducting metal oxide to be effectively used in this invention, such semiconducting oxides of a single metal element as $TiO_2$, $VO_2$, $V_2O_5$, α-$Fe_2O_3$, $CuO$, $Co_3O_4$, $Nb_2O_5$, $SnO_2$, and $WO_3$ may be cited. When a semiconducting composite oxide is used, it is permissible to use either a mixture of semiconducting oxides of the single metal element mentioned above or a semiconducting oxide of a plurality of metal elements.

As the semiconducting composite oxide, semiconducting composite oxides of an element like V with an element like Nb and Ta both of which elements are of the same family and form oxides of a similar crystal structure, semiconducting composite oxides of an element like V with an element like Co and Cu both of which elements exhibit large third-order nonlinear optical effects, and semiconducting composite oxides of an element(s) like V which exhibits a third-order nonlinear optical effect and an element(s) like Zr which means a relatively small contribution to the third-order nonlinear optical effect may be used. As typical examples of the third kind, $Mg_2Al_2O_4$, $MnFe_2O_4$, $FeFe_2O_4$ (=$Fe_3O_4$), $CoFe_2O_4$, $NiFe_2O_4$, $CuFe_2O_4$, $ZnFe_2O_4$, $MgFeO_4$, $Cu_{0.5}Zn_{0.5}Fe_2O_4$, $MnCo_2O_4$, $PbCrO_4$, $CdCr_2O_4$, $MgCr_2O_4$, $NiCo_2O_4$, $NiMnCo_4O_8$, $NiCr_2O_4$, $SnZn_2O_4$, $TiZn_2O_4$, $SnCo_2O_4$, $ZnCr_2O_4$, $LaMnO_3$, $SrMnO_3$, $LaFeO_3$, $MgWO_4$, $SrTiO_3$, $CaTiO_3$, $GeTiO_3$, $SrZrO_3$, $ZrV_2O_7$, $V_3Zr_3O_7$, $V_3Ti_6O_{17}$, and $Zn_3V_3O_8$ may be cited.

The semiconducting composite oxide may contain a part (phase) having semiconducting oxides of single metallic element separated from each other. Further, the semiconducting metal oxides to be used in this invention may embrace such hydrated vanadium oxides as, for example, $V_2O_5.H_2O$ and $VO_2.H_2O$. Among the semiconducting composite oxides cited above, semiconducting oxides of at least one transition metal selected from the group of such transition elements of the 4th period as Sc, Ti, V, Cr, Mn, Fe, Co, Ni, and Cu which exhibit large third-order nonlinear optical effects prove to be particularly advantageous. As typical examples thereof, $Cr_2O_3$, $MnO_2$, $Fe_2O_3$, $Co_3O_4$, $V_2O_5$, $VO_2MnCo_2O_4$, $NiCo_2O_4$, $NiMnCo_4O_8$, $ZrV_2O_7$, $V_3Zr_3O_7$, $V_3Ti_6O_{17}$, $Zn_3V_3O_8$, $V_2O_5.H_2O$, and $VO_2.H_2O$ may be cited.

The semiconducting metal oxide to be used in this invention allows the electric conductivity thereof to be adjusted to a desired magnitude by adding an impurity to the metal oxide thereof. This invention does not particularly discriminate the impurity on account of its species. As examples of the impurity which is effectively used herein, monovalent metal ions such as $Na^+$, $Li^+$, and $K^+$, divalent metal ions such as $Ca^{2+}$, $Mg^{2+}$, and $Cu^{2+}$, and trivalent metal ions such as $Al^{3+}$ and $Fe^{3+}$ may be cited. The amount of the impurity added is not more than 10 atomic percentage (i.e., the number of the metal elements of the impurity is not more than 10 based on 100 of the nunmer of the metal elements of the main elements), preferably not more than 5 atomic percentage, of the main element(s) (metal element(s) of the metal oxide).

The semiconducting metal oxide to be used in this invention is enabled to manifest a quantum size effect and acquire improvement in oscillator strength and third-order nonlinear susceptibility by the fact that it is uniformly dispersed in the form of fine particles in a polymer. The manifestation of the quantum size effect results in increasing the sharpness of the leading edge of absorption and causing the absorption spectrum to produce a blue shift. It is inferred that when the laser beam to be used approximates closely to the absorption edge, the relaxation speed is heightened because this laser beam is enabled to manifest the third-order nonlinear optical effect with the smallest possible absorption of light. By the reasons adduced above, the metal oxide is morphologically preferred to be small in size, preferably in the form of fine particles having a particle diameter of not more than 1 $\mu$m, more preferably not more than 500 nm, and most preferably not more than 100 nm.

The third-order nonlinear optical material of this invention is at an advantage in retaining the interface between the fine particles of the semiconducting metal oxide and the polymer in good order and not readily generating a defect in the semiconducting metal oxide contained in the polymer because the components of the composition of the third-order nonlinear optical material during the process of manufacture thereof do not need to undergo the thermal fusion technique at a temperature of not less than 1000° C., for example, which is performed in the conventional. It also enjoys stability enough to withstand the effect of the laser beam because it uses a chemically stable metal oxide.

The polyacid to be effectively used in this invention is subject to no particular restriction except for the requirement that it be capable of manifesting a third-order nonlinear optical effect on the exposure to a laser beam. It is nevertheless preferred to be a polyacid containing a metal element. More preferably, a polyacid having an absorption at a wavelength of not less than 248 nm and a polyacid having the nature as a semiconductor may be used.

This invention does not particularly discriminate the polyacid on account of the species thereof. As typical examples thereof, polyacids which contain metal elements of the Group III through Group VI in the Periodic Table of the Elements, preferably such metal elements as Si, V, Nb, Ta, Cr, Mo, and W, may be cited. To be specific, the polyacid maybe any of the isopoly acids composed of oxygen and one kind of metal element, namely (polynuclear) oxo acids formed by subjecting inorganic oxo acids which is not very strong as acid to the dehydration condensation in an acidic aqueous solution, and the heteropoly acids composed of oxygen and two or more kinds of metal elements, namely ternary polyoxo acids formed by subjecting vanadlic acid, niobic acid, molybdic acid, and tungstic acid among the inorganic oxo acids to the dehydration condensation with a transition metal or the ions of a typical element (hetero atom) in an acidic aqueous solution. Among the poly acids mentioned above, those which include in the components of the composition thereof at least one kind of metal element selected from the group consisting of V, Mo, and W prove to be particularly appropriate.

The polyacid mentioned above may be used in various forms. Firstly, as respects isopoly acids (or the salts thereof), it has been well-known that polyvanadates (vanadates), for example, namely the isopoly acids represented by the general formula: $mM_2O.nV_2O_5.xH_2O$ (wherein M represents a monovalent metal element), assume the forms of ortho vanadates, pyrovanadates, and metavanadates, as well as the forms of various complicated polyacids, depending on the V concentration and the pH value. They may also assume the forms of heteropoly acids. Similarly, the polymolybdates, i.e. the isopoly acids represented by the general formula: $mM_2O.nMoO_3.xH_2O$ (wherein M represents a monovalent metal element), may assume such forms as satisfy (m, n)=(1, 2), (1, 3), (1, 4), (1, 6), (1, 8), (1, 10), (1, 16), and (2, 8) [metamolybdates] and (3, 7) [paramolybdates], depending on the pH value. Then, the polytungstates, i.e. the isopoly acids represented by the general formula, $mM_2O.nWO_3.xH_2O$ (wherein M represents a monovalent metal element), may assume such forms of varying degrees of condensation as paratungstates satisfying (m, n)=(5, 12) and metatungstates satisfying (m, n)=(6, 12), depending on the pH value. Further, the polychromates, i.e. the isopoly acids represented by the general formula: $MCr_nO_{3n+1}$ (wherein M represents a monovalent metal element), may assume various forms of polyacids having different degrees of condensation, depending on the pH value. Next, the heteropoly acids (or the salts thereof) may assume such forms as, for example, $H_3[HSiW_{12}O_{40}]$, $H_3[PMo_{12}O_{40}]$, $(NH_4)_3$, $[PMo_{12}O_{40}]$, $H_7[Co^{II}Co^{III}W_{12}O_{42}]$, and $H_3[PV_2Mo_{10}O_{40}]$. The polyacid to be used effectively in this invention may assume any of the forms mentioned above.

As the polyacids mentioned above, those which have a wide absorption in the ultraviolet, visible, and infrared regions and exhibit the nature as a semiconductor may be preferably used. To be specific, the polyacids which prove to be appropriate herein have an absorption at a wavelength of not less than 248 nm, preferably not less than 350 nm, and more preferably not less than 500 nm, and manifest a third-order nonlinear optical effect on the exposure to a laser beam. It is inferred that the polyacid which has an absorption at a wavelength in the range as mentioned above, possesses the nature as a semiconductor, and manifests a third-order nonlinear optical effect on the exposure to a laser beam is enabled to manifest the third-order nonlinear optical effect by the so-called band-filling phenomenon which consists in prominently augmenting the carrier density in the excited state in consequence of the irradiation of a laser beam near the band gap and consequently inducing saturated absorption and a change in refractive index. Since it suffices to select the wavelength of the laser in compliance with the size of the band gap, it may well be concluded that this invention enjoys a very rich variety of species of polyacids to be usable. Further, the polyacid to be used is stable to resist the laser beam because it is a chemically stable type.

For the purpose of decreasing the absorption of the laser beam by components other than the polyacid and preventing the laser beam from impairing the component, it is advantageous to adopt polyacid having an absorption at a wavelength of not less than 350 nm and operate the laser beam at a wavelength of not less than 350 nm. As examples of the polyacid which satisfies these requirements, heteropoly acids such as metavanadates, pyrovanadic acid (salts), orthovanadic acid (salts), and $H_3[PV_2Mo_{10}O_{39}]$, and $M_2Mo_6O_{19} \cdot xH_2O$ and $M_2W_{10}O_{31} \cdot xH_2O$ (wherein M represents a monovalent metal element) may be cited.

The third-order nonlinear optical material of this invention is preferred to contain the polyacid mentioned above at a concentration of not less than 1% by weight, particularly at a concentration in the range of 70 to 95% by weight. It may be composed of the polyacid and at least one other component. For example, a matrix for containing the polyacid in a uniformly dispersed state may be used as the one other component. The material, when necessary, may be composed solely of the polyacid. No matter what composition the third-order nonlinear optical material may possess, the absorption of the polyacid at the operating wavelength is preferred to be not less than 90% of the absorption of the whole material. If the absorption of the polyacid is less than 90% of the absorption of the whole material, the produced material will possibly be deficient in the performance as an optical material. The component other than the polyacid mentioned above is subject to no particular restriction except for the requirement that it possess transparency and excel in compatibility with the polyacid. As typical examples thereof, such known materials for matrix as glass, amorphous $SiO_2$, $Al_2O_3$, $ZrO_2$, $TiO_2$, and MgO may be cited. The refractive index of the matrix had better be high. The matrix is preferred to be a polymer which excels in lightfastness, weatherability, heat-resistance, safety, and processability.

In the third-order nonlinear optical material of the present invention, the polyacid mentioned above is enabled to manifest a quantum size effect and gain in oscillator strength and third-order nonlinear susceptibility owing to the fact that it is uniformly dispersed in the form of fine particles in a polymer. Then, the manifestation of the quantum size effect results in sharpening the leading edge of absorption and causing the absorption spectrum to produce a blue shift. It is further inferred that the use of a laser approximating closely to the absorption edge enables the third-order nonlinear optical effect to manifest with the least possible absorption of light and the relaxation speed to heighten. Since it is judged advantageous for the reasons adduced above that the polyacid to be contained in a uniformly dispersed state in a polymer has as small a particle diameter as permissible, the polyacid which is retained in the polymer is morphologically preferred to be in the form of fine particles having a diameter of not more than 1 μm, preferably not more than 500 nm, and more preferably not more than 100 nm.

For the observation and the identification of metal oxide particles (including semiconducting metal oxide particles and polyacid) in the third-order nonlinear optical material, any of the well-known methods such as, for example, the analysis by the X-ray diffraction, the observation of a sliced thin film of the material with the aid of a transmission electron microscope, and the observation of the surface of the thin film with the aid of a scanning probe microscope may be adopted. The third-order nonlinear optical material according to this invention is such that the visible-ultraviolet absorption spectrum thereof can afford the following information concerning the fine particle distribution. The decrease in particle diameter generally results in the appearance of a quantum size effect of electrons and positive holes, or excitons. It is known that the wavelength at which given particles start absorbing light consequently shifts to the shorter wavelength side in accordance as the diameter of the particles decreases.

As disclosed in New Glass, Vol.4, No.2, p.18 (1989), for example, when the quantum size effect is manifested, the energy in the lowest state is heightened as indicated by the following formula (1):

$$\Delta E_z \approx \frac{\hbar^2 \pi^2}{2m_e a^2} n^2 \tag{1}$$

(wherein $\Delta E_z$ stands for an energy which is increased by the quantum size effect, $\hbar$ for a quotient of the division of the Planck's constant by $2\pi$, $m_e$ for an effective mass of electrons in crystal, a for a length of one side, and n for a quantum number) and the wavelength for starting absorption is enabled to produce a blue shift accordingly. Based on the shift of the wavelength for starting the absorption in the spectrum, therefore, the particle diameter can be estimated by using the formula (1) mentioned above.

For the manufacture of the polyacid to be used in this invention, following methods may be cited, for example.

1) A method which attains the manufacture by adding an acid to an alkali solution of such a metal salt as ammonium vanadate or potassium tungstate and subjecting the resultant mixture to the dehydration condensation;

2) A method which attains themanufacture by subjecting a metal salt such as a chloride and a metal alkali to double decomposition in an aqueous solution or in a molten state; and 3) A method which attains the manufacture by subjecting an aqueous solution of a metal salt to the dehydration condensation by means of ion-exchange (proton-exchange). Among the methods mentioned above, the method of 3) proves to be particularly advantageous because it is simple and can produce a polyacid having high purity.

The term "transparent polymer" which is used in this invention refers to a polymer which has substantially no absorption at a wavelength within the range of the operating wavelength to a wavelength shorter than the operating wavelength by at least 100 nm, preferably 200 nm. In this case, the phrase "substantially no absorption" means that the absorption of the polymer is not more than 10%, preferably 3%, of the absorption of the metal oxide, as determined by the comparison of the absorbance per unit thickness thereof. By incorporating the metal oxide into the transparent polymer according to this invention, the advantages such as that the absorption around at the operating wavelength can be decreased, the quantum size effect can be efficiently manifested, the figure of merit, $\chi^{(3)}/\alpha$ (which will be described in detail below), can be increased, and the relaxation speed can be heightened will ensue.

When the polymer has some absorption at the operating wavelength, such disadvantages may be generated as that light for the manifestation of third-order nonlinear optical effect be absorbed into the polymer and subjected to attenuation. Further, when the polymer has some absorption in the vicinity of the operating wavelength (within the range of the operating wavelength to a wavelength shorter than the operating wavelength by 200 nm), the quantum size effect must be disadvantageously degraded.

By these reasons, the transparent polymer used in this invention is required to have substantially no absorption at a wavelength within the range of the operating wavelength to a wavelength shorter than the operating wavelength by at least 100 nm, preferably 200 nm.

The operating wavelength is preferred to be approximately a wavelength at which the absorption by the metal oxide starts. By setting the operating wavelength as mentioned above, the figure of merit can be expected to be improved.

Concerning the polymer to be used in this invention, if it has a high electric conductivity, it more often than not follows that the coloration due to the excitation of the conjugate electrons of the material will gain in intensity and the optical transparency will degrade. If the polymer has a strong absorption at the operating wavelength, the energy gap of the polymer will be unduly small, the quantum size effect of electrons and positive holes, or excitons brought about by the absorption of light by the metal oxide, particularly polyacid will not readily manifest, and the exaltation of the third-order nonlinear optical effect due to the quantum size effect will not be expected. Further, the relaxation of the third-order nonlinear optical effect will be retarded by the same reason. The high absorption is not advantageous because the electrons and the positive holes generated by the absorption of light will possibly migrate to the polymer and consequently decompose or oxidize the polymer.

The polymer to be used in this invention, therefore, has preferably an electric conductivity of not more than $10^{-10}$ S/cm, preferably not more than $10^{-12}$ S/cm. The measurement of the electric conductivity can be performed by testing for a compressed pellet sample or a film sample with a direct current four-terminal method. This polymer is preferred to have transparency at the operating wavelength and exhibit a satisfactory ability to disperse the metal oxide, particularly polyacid. The absorption of the polymer at the operating wavelength is more preferred to be not more than 10% of the whole absorption at the operating wavelength. If the metal oxide, particularly polyacid has an unduly low dispersing ability, it will aggregate in the polymer possibly to the extent of aggravating the scattering of light and degrading the quality as an optical material. The polymer had better have a high glass transition point for the purpose of enabling the metal oxide, particularly polyacid contained therein to remain in a stably dispersed state over a long period.

As typical examples of the polymer to be effectively used in this invention, those which excel in transparency such as polystyrene, polyethylene, acrylonitrile/styrene copolymer, polypropylene, polyesters, polyamides, polycarbonates, polymethyl methacrylate, poly acrylates, polyvinyl methyl ether, polyethylene terephthalate, and polyvinyl chloride may be cited. Among the polymers cited above, such polyamides, polycarbonates, and polystyrene as exhibit a relatively high glass transition point and excel in heat-resistance prove to be particularly advantageous. These polymers may be used as mixed at a ratio arbitrarily selected.

When the polymer is mixed with the metal oxide, particularly polyacid in a solvent, it is preferred to be soluble in the solvent and further to be capable of being insolubilized by cross-linkage.

The third-order nonlinear optical material of this invention which incorporates the polymer therein may, in the process of manufacture thereof for the sake of improving the dispersibility of the metal oxide, particularly polyacid in the polymer, incorporate additionally therein a varying anionic, cationic, or nonionic surfactant.

Where the third-order nonlinear optical material of this invention incorporating the polymer therein is used for manufacturing such a device as, for example, an optical waveguide path, it is particularly appropriate to use as the polymer either a photosensitive resin or a thermosetting resin. As typical examples of the photosensitive resin, such intermolecular crosslinking photo-insolubilizing (negative) photosensitive polymers as are obtained by introducing such photosensitive groups as, for example, (1) a cinnamic acid residue, (2) a chalcone residue, (3) an acrylic acid residue, (4) a diazonium salt residue, and (5) phenyl azide residue severally into PVA, novolak resin, acrylic acid type resin, and epoxy resin; and such photo-solubilizing (positive) photosensitive polymers soluble in an aqueous alkali solution as are obtained by introducing such photosensitive groups as, for example, (6) an o-quinone azide residue into the same resins as mentioned above may be cited. In the manufacturing process as mentioned above, the (1) and (2) residues are introduced by the photo-dimerization, the (3) residue by photo-polymerization, the (4) and (5) residues by photo-decomposition, and the (6) residue by photo-decomposition, respectively. As typical examples of the thermosetting resin, phenol resins, furan resins, xylene-formaldehyde resins, ketone-formaldehyde resins, urea resins, melamine resins, aniline resins, alkyd resins, unsaturated polyester resins, and epoxy resins, as well as diethylene glycol bisallyl carbonate may be cited.

For the purpose of causing the polymer mentioned above to contain therein the metal oxide, preferably in a uniformly dispersed state, a method which comprises mixing the metal oxide with the polymer in a solvent or a method which comprises causing the polymer to contain the metal-oxide therein at a temperature at which the polymer is fused may be adopted. When the mixture of the metal oxide is performed in a solvent, the metal oxide is preferred to be the hydrate of the oxide. Even when the metal oxide are contained in a dispersed state at the melting point of the polymer, the possibility that the metal oxide will be impaired and the interface between the fine particles and the polymer will be disturbed is nil because the polymer does not need to undergo the thermal fusion at an elevated temperature which is indispensable to glass.

Though the ratios of the metal oxide and the polymer in the third-order nonlinear optical material according to this invention do not need to impose any particular limit, the ratio of the metal oxide is preferred to be as high as possible because the polymer is a matrix for confining the metal oxide therein preferably in a uniformly dispersed state and, therefore, makes no contribution to the manifestation of the third-order nonlinear optical effect. Since the polymer has its own irreducible minimum for the purpose of improving the dispersed state of the metal oxide, however, the ratio of the metal oxide is in the approximate range of 1 to 99% by weight, preferably 5 to 80% by weight, and more preferably 10 to 70% by weight, based on the weight of the whole material. The ratio of the polymer is preferred to be in the range of 1 to 50% by weight, particularly 5 to 30% by weight, based on the weight of the whole material.

For the purpose of causing the polymer mentioned above to contain therein the semiconducting metal oxide, preferably in a uniformly dispersed state, a method which comprises mixing the semiconducting metal oxide with the polymer in a solvent or a method which comprises causing the polymer to contain the semiconducting metal oxide therein at a temperature at which the polymer is fused may be adopted. When the mixture of the semiconducting metal oxide is performed in a solvent, the semiconducting metal oxide is preferably a hydrate of the metal oxide having a semiconductivity. Even when the semiconducting metal oxide are contained in a dispersed state at the melting point of the polymer, the possibility that the semiconducting metal oxide will be impaired and the interface between the semiconducting metal oxide and the polymer will be disturbed is nil because the polymer does not need to undergo the thermal fusion at an elevated temperature which is indispensable to glass.

Though the ratios of the semiconducting metal oxide and the polymer in the third-order nonlinear optical material according to this invention do not need to impose any particular limit, the ratio of the semiconducting metal oxide is preferred to be as high as possible because the polymer is a matrix for confining the semiconducting metal oxide therein preferably in a uniformly dispersed state and, therefore, makes no contribution to the manifestation of the third-order nonlinear optical effect. Since the polymer has its own irreducible minimum for the purpose of improving the dispersed state of the semiconducting metal oxide, however, the ratio of the semiconducting metal oxide is in the approximate range of 1 to 99% by weight, preferably 5 to 80% by weight, and more preferably 10 to 70% by weight, based on the weight of the whole material. The ratio of the polymer is preferred to be in the range of 1 to 50% by weight, particularly 5 to 30% by weight, based on the weight of the whole material.

For the purpose of causing the polymer mentioned above to contain therein the polyacid, preferably in a uniformly dispersed state, a method which comprises mixing the polyacid with the polymer in a solvent or a method which comprises causing the polymer to contain the polyacid therein at a temperature at which the polymer is fused may be adopted. When the mixture of the polyacid is performed in a solvent, the polyacid is preferably a hydrate of the metal oxide having a semiconductivity. Even when the polyacid are contained in a dispersed state at the melting point of the polymer, the possibility that the polyacid will be impaired and the interface between the polyacid and the polymer will be disturbed is nil because the polymer does not need to undergo the thermal fusion at an elevated temperature which is indispensable to glass.

In the third-order nonlinear optical material obtained by having the polyacid to be contained in the polymer and used for this invention, the ratios of the polyacid and the polymer are not particularly limited. The ratio of the polyacid, however, is preferred to be as high as possible because the polymer is a matrix for confining the polyacid preferably in a uniformly dispersed state and makes no contribution to the manifestation of the third-order nonlinear optical effect. The remarks hold good for the component of the composition which is other than the polyacid and also other than the polymer mentioned above. Since the polymer (and/or the component of the composition other than the polymer) has its own irreducible minimum for the purpose of improving the dispersed state of the polyacid, however, the ratio of the polyacid is in the approximate range of 50 to 99% by weight, preferably 70 to 95% by weight, based on the weight of the whole material. The ratio of the polymer is preferred to be in the range of 1 to 50% by weight, particularly 5 to 30% by weight, based on the weight of the whole material.

The third-order nonlinear optical material according to this invention can be fabricated in any shape suitable for the use for which this material is intended. The polymer having fine particles of the metal oxide contained therein in a dispersed state can be used, for example, in the form of lens or fibers obtained by mechanically cutting the substance or rolling, stretching, melting, or injection molding the substance, in the form of a thin film obtained by spin coating or dip coating the substance on a glass substrate, or in the form of elements obtained by the techniques of reactive etching or photolithography. These forms are not exclusive.

The form in which the third-order nonlinear optical material is advantageously used for the manufacture of an optical device is a thin film formed on a transparent substrate. In this case, the thickness of the thin film is in the range of 10 nm to 20 $\mu$m, preferably 100 nm to 10 $\mu$m.

The transparent substrate mentioned above has an absorption at an operating wavelength of not more than 5%, preferably not more than 3%, based on the total absorption. As typical examples of the transparent substrate which is used effectively herein, silica glass type substrates such as a fused quartz substrate, a synthetic quartz glass, and an aluminosilicate glass substrate and single crystal substrates such as of MgO, $\alpha$-$Al_2O_3$, and $SrTiO_3$ may be cited. The transparent substrate can be used irrespectively of the largeness of area specifically. It can be used in a thickness in the range of 10 $\mu$m to 1 mm.

The manufacture of the third-order nonlinear optical material according to this invention is not particularly discriminated on account of a method to be adopted. In a method for manufacturing the third-order nonlinear optical material having the metal oxide, particularly polyacid contained in the polymer, for example, the metal oxide, particularly polyacid and the polymer may be mixed in a solvent. Otherwise, a method which consists in dispersing the metal oxide, particularly polyacid in the polymer at the melting point thereof may be adopted. Nevertheless, a method which comprises preparing a liquid having the metal oxide, particularly polyacid and the polymer dissolved or dispersed therein and distilling this liquid thereby expelling the solvent or the dispersion medium is preferred. Since this method enables the polymer matrix to contain the metal oxide, particularly polyacid therein in a uniformly dispersed state, it requires no complicated treatment or procedure, and obviates the necessity of undergoing the heat-treatment effected as by elevating the temperature beyond 1000° C. or fusing as practiced in the conventional technique, it is at an advantage in excelling in processability, allowing the produced material to keep in order the interface between the metal oxide, particularly polyacid and the polymer, and not easily inflicting damage to the produced material.

The solvent or dispersion medium to be used effectively in the method of manufacture mentioned above is only required to be capable of dissolving or dispersing the metal oxide, particularly polyacid and the polymer being used at prescribed ratios. The solvent or dispersion medium which answers the description is preferred to be a solvent which exhibits relatively high polarity evinced by a solvent polarity parameter not less than 40 and enjoys compatibility with water. As typical examples thereof, alcohols such as methanol, ethanol, 1-propanol, and 2-propanol, ketones such as acetone and methylethyl ketone, nitriles such as acetonitrile and propyl nitrile, ethers such as dioxane, and dimethyl formamide and dimethyl sulfoxide may be cited. These solvents may be used either singly or in the form of a mixture of two or more members at proportions of arbitrary choice. The boiling point of the selected solvent under normal pressure is preferred to be not higher than 250° C., particularly not higher than 200° C.

For the manufacture of the third-order nonlinear optical material, it suffices to prepare a liquid having the metal oxide, particularly polyacid and the polymer dissolved or dispersed therein and then distill the liquid thereby expelling the solvent or dispersion medium therefrom. Any of the well-known methods for (reduced-pressure) distillation may be adopted for this purpose.

For the expulsion of the solvent or dispersion medium by distillation, the solvent or dispersion medium is required to be heated to a temperature of not less than the boiling point thereof under the pressure prevalent therein. The manufacture of the third-order nonlinear optical material, when necessary, may be attained at a relatively low temperature by heating under a reduced pressure. In this case, the temperature of the solvent or dispersion medium to be expelled is preferably not more than 200° C., and the pressure is preferably in the range of 760 mmHg to 10 mmHg.

Now, this invention will be described more specifically below with reference to working examples. The determination methods which are used herein are as follows.

(1) Determination of Third-order Nonlinear Susceptibility

This property was determined by the phase-conjugated type degenerate four wave mixing method. The second harmonic of the Nd:YAG laser (532 nm in wavelength and 40 psec in pulse duration) was used for the determination. The third-order nonlinear susceptibility, $\chi^{(3)}$, was calculated based on the following formula (2) using the ratio of the reflectivity, R, to the standard substance ($CS_2$) in the same optical system:

$$\chi^{(3)}{}_S = \chi^{(3)} CS_2 (R_S/R_{CS_2})^{1/2} (L_{CS_2}/L_S)(n_S/n_{CS_2})^2 \times Q \qquad (2)$$

Wherein L stands for a thickness of a third-order nonlinear optical material, n for a refractive index, S accompanied by subscript for a sample, $CS_2$ accompanied by subscript for carbon disulfide, and Q for a correction coefficient defined by the following formula (3):

$$Q = ln(1/T)/\sqrt{T}(1-T) \qquad (3)$$

Wherein T represents a transmittance of the sample.

(2) Determination of Intensity of Phase-conjugated Light (Calculation of Relaxation Speed of Response)

The relaxation speed of response was determined by measuring intensity of the phase-conjugated light by delaying the incident time of the backward pump light in the degenerate four wave mixing method as disclosed in Materials Research Society Symposium Proceeding, Vol.283, pp.903–908 (1993).

(3) Determination of Particle Diameter of Fine Particles (Dispersing Medium) in Thin Film The particle diameter of fine particles (dispersing medium) in a thin film was determined by the observation of the surface of the thin film through a scanning probe microscope (SPM) (produced by Digital Instruments Corp. and marketed under trademark designation of "Nanoscope").

(4) Determination of Absorbance

The absorbance was determined by the use of the following instrument under the following conditions.

Instrument: Spectrophotometer (produced by Shimadzu Seisakusho Ltd. and marketed under product code of "UV-3100")

Conditions: The absorbance was determined at a room temperature, at a scan rate of wavelength of 200 nm/min, and with a slit width of 5.0 nm.

(5) Calculation of Absorption of Polymer

This calculation was carried out by the following procedure.

1) The polymer was tested preparatorily for absorption per unit thickness at the operating wavelength (532 nm) (A1).
2) Then, the whole material was similarly tested for absorption and reduced to the value per unit thickness (A2).

When the value of A1 was not more than 10% of the value of A2, the absorption of the polymer was judged to be not more than 10% of the absorption of the whole material.

Referential Example 1

A column packed with an ion-exchange resin (Dowex 50W-8) was washed with an aqueous 4M hydrochloric acid solution to obtain a column of an $H^+$-substituted ion-exchange resin. A solution of 17.5 g (0.15 mol) of ammonium vanadate in 1000 g of distilled water was passed through the column filled with the $H^+$-substituted ion-exchange resin, to obtain an effluent. The column effluent was left standing at a room temperature for not less than 24 hours, to obtain a solution (1) containing polyvanadic acid.

Referential Example 2

A thin film (1) for comparison was obtained by spin coating the solution (1) on a glass substrate. When the surface of the thin film (1) for comparison was observed by means of SPM, the thin film was found to comprise fine particles of about 400 nm in particle diameter.

Referential Example 3

A solution (2) was obtained by following the procedure of Referential Example 1 while using ammonium tungstate pentahydrate in place of ammonium vanadate. A thin film (2) for comparison was obtained by spin coating the solution (2) on a glass substrate. When the surface of the thin film (2) for comparison was observed by means of SPM, the thin filter was found to comprise fine particles of about 30 nm in particle diameter.

Referential Example 4

A solution of 1.0 g of zinc 2-ethyl hexanoate (zinc content of 8% by weight) in 7.0 g of n-butanol was spin coated on a glass substrate to obtain a coating. The resultant coating was left standing at a room temperature for one hour and then calcined at 380° C. for two hours to obtain a thin film (3) for comparison. When the thin film (3) for comparison was subjected to observation of surface by means of SPM and to an X-ray diffraction analysis, this film was found to comprise fine zinc oxide particles of 8 nm in particle diameter.

Referential Example 5

A methanol solution of poly(vinyl methyl ether) (solids content of 50% by weight; produced by Tokyo Kasei Kogyo Co., Ltd. and marketed under product code of "P1007") was diluted with methanol until a solids content of 5% by weight.

The diluted solution was spin coated on a glass substrate and dried at 80° C. for 30 minutes to obtain a thin film (4) for comparison. When the thin film (4) for comparison was analyzed for an ultraviolet-visible absorption spectrum, no discernible absorption was observed at a wavelength of not less than 330 nm, indicating that the absorption has not been recognized at the wavelength within the range of from the operating wavelength to be used in Example 1, namely, 532 nm, to the wavelength shorter than the operating wavelength by 200 nm.

Referential Example 6

A compressed pellet sample of polyvinyl methyl ether) was prepared and tested for an electric conductivity by a direct current four-terminal method, to find $4\times10^{-12}$ S/cm.

Example 1

20 g of a solution which is obtained by concentrating the solution (1) prepared in Referential Example 1 to a solids content of 5% by weight and 20 g of a diluted solution to be obtained by diluting a methanol solution of poly(vinyl methyl ether) (solids content of 50% by weight; produced by Tokyo Kasei Kogyo Co., Ltd. and marketed under product code of "P1007") further with methanol until a solids content of 5% by weight were stirred together at a room temperature for one hour to obtain a polymer mixed solution (1). This polymer mixed solution (1) was spin coated on a glass substrate and dried at 80° C. for 30 minutes to obtain a thin film (1) of a third-order nonlinear optical material having vanadium oxide ($V_2O_5 \cdot nH_2O$), as a metal oxide, contained in polyvinyl methyl ether, as a polymer. This thin film (1) was formed very easily without requiring any heating treatment at an elevated temperature.

When the surface of the thin film (1) was observed by means of SPM, the thin film (1) was found to have fine particles of about 400 nm in particle diameter contained in a dispersed state in polyvinyl methyl ether.

The absorption spectra of the thin film (1) and the thin film (1) for comparison obtained in Referential Example 2 are shown in FIG. 1. The spectrum of the thin film (1) is found to have a sharp leading edge of absorption and produce a blue shift of the wavelength for starting absorption, as compared with that of the thin film (1) for comparison.

At the operating wavelength (532 nm) of the thin film (1), the absorption of polymer was substantially nil, i.e. not more than 10% of the absorption of the whole thin film (1). The thin film (1) was found to have the absorption at a wavelength of 350 nm, as shown in FIG. 1.

Then, the thin film (1) and the thin film (1) for comparison were tested for third-order nonlinear susceptibility to find a figure of merit [$\chi^{(3)}/\alpha$ (wherein $\alpha$ represents an absorption coefficient)] by calculation. The results are shown in Table 1. It is clearly noted from Table 1 that the thin film (1) showed a figure of merit, $\chi^{(3)}/\alpha$, of $4.4\times10^{-13}$ esu·cm, a magnitude nearly equal to that of the thin film (1) for comparison. This fact indicates that the thin film (1) has only small absorption and manifests a high third-order nonlinear optical effect.

The thin film (1) and the thin film (1) for comparison were tested for phase-conjugated optical intensity by retarding the laser pulse reaching the sample, to determine a relaxation speed. The results are shown in Table 1. From Table 1, the thin film (1) is noted to show a markedly high relaxation as compared with the thin film (1) for comparison.

TABLE 1

| Sample | Figure of merit ($=\chi^{(3)}/\alpha$) (esu · cm) | Relaxation speed of response | |
|---|---|---|---|
| | | Delay time of laser pulse, 60 psec | Delay time of laser pulse, 130 psec |
| Thin film (1) | $4.4 \times 10^{-13}$ | 0.06*1 | 0.02*1 |
| Thin film (1) for comparison | $3.1 \times 10^{-13}$ | 0.28*1 | 0.19*1 |

*1: Relative value based on the value for delay time of 0 taken as 1.

The results given above indicate that the incorporation of vanadium oxide in a dispersed state in the polymer sharpened the leading edge of absorption and produced a blue shift of the absorption edge. The determination of the third-order nonlinear susceptibility revealed that the thin film (1) showed a large third-order nonlinear optical effect and notably decreased the time of relaxation preceding the distinction of this effect.

Example 2

A thin film (2) of a third-order nonlinear optical material having vanadium oxide, as a metal oxide, contained in a polyvinyl methyl ether, as a polymer, was obtained by following the procedure of Example 1 while using a solution obtained after 5 hours' passage of the ion-exchange column instead. This thin film (2) could be formed very easily without requiring any heating treatment at an elevated temperature.

When the surface of the thin film (2) was observed by means of SPM, the thin film (2) was found to have fine particles of about 200 nm in particle diameter contained in a dispersed state in the polyvinyl methyl ether.

The absorption spectrum of the thin film (2) showed a sharp leading edge of absorption and a greater blue shift of the absorption edge than the thin film (1).

At the operating wavelength (532 nm) of the thin film (2), the absorption of polymer was substantially nil, i.e. not more than 10% of the absorption of the whole thin film (2). The thin film (2) was found to have absorption at a wavelength of 350 nm.

Example 3

A thin film (3) of a third-order nonlinear optical material having tungsten oxide ($WO_3 \cdot nH_2O$), as a metal oxide, contained in polyvinyl methyl ether, as a polymer, was obtained by following the procedure of Example 1 while using ammonium tungstate pentahydrate instead. The thin film (3) could be formed very easily without requiring any heating treatment at an elevated temperature.

When the surface of the thin film (3) was observed by means of SPM, the thin film (3) was found to have fine particles of about 30 nm in particle diameter contained in a dispersed state in the polyvinyl methyl ether.

The absorption spectrum of the thin film (3) showed the occurrence of a greater blue shift of the absorption edge as compared with that of the thin film (2) prepared in Referential Example 3.

At the operating wavelength (532 nm) of the thin film (3), the absorption of polymer was substantially nil, i.e. not more than 10% of the absorption of the whole thin film (3). The thin film (3) was found to have absorption at a wavelength of 350 nm.

Example 4

In a glass reaction vessel, 500 ml in inner volume, provided with a stirrer, a dropping inlet, a thermometer, and a reflux condenser, a mixed solvent composed of 80 g of acetic acid and 80 g of deionized water and 15 g of zinc oxide powder added thereto were together stirred and heated up to 100° C. to obtain a zinc-containing solution.

Then, in a glass reaction vessel, 1 liter in inner volume, provided with a stirrer, a dropping inlet, a thermometer, and a distillate gas outlet, 700 g of 2-butoxy ethanol was placed and the inner temperature thereof was heated to and kept at 153° C. To the hot 2-butoxy ethanol, the aforementioned zinc-containing solution kept at 100° C. was drip-fed by the use of a metering pump over a period of 30 minutes. After the completion of this drip-feeding, the contents of the reaction vessel was heated to and kept at 168° C. for 5 hours to obtain a white dispersion. This dispersion was concentrated by an evaporator to an involatile content of 10% by weight, to obtain a dispersing element. 5 g of this dispersing element and 1 g of an acrylic resin solution (solids content of 45% by weight; produced by Nippon Shokubai Co., Ltd. and marketed under trademark designation of "AROSETTO 5210") added thereto were together stirred at a room temperature for one hour to obtain a polymer mixed solution. A thin film (4) of a third-order nonlinear optical material having fine particles of zinc oxide, as a metal oxide, contained in the acrylic polymer, as a polymer, was obtained by following the procedure of Example 1 while using this polymer mixed solution instead. This thin film (4) could be formed very easily without requiring any heating treatment at an elevated temperature.

When the surface of the thin film (4) was observed by means of SPM, this thin film (4) was found to contain fine particles of zinc oxide of 5 nm in particle diameter in a dispersed state in the acrylic polymer.

The absorption spectrum of the thin film (4) showed a sharper leading edge of absorption as compared with the absorption spectrum of the thin film (3) for comparison obtained in Referential Example 4 and also revealed the occurrence of a blue shift of the wavelength for starting absorption.

At the operating wavelength (532 nm) of the thin film (4), the absorption of polymer was substantially nil, i.e. not more than 10% of the absorption of the whole thin film (4). The thin film (4) was found to have absorption at a wavelength of 350 nm.

The entire disclosure of Japanese Patent Application Nos. 08-316706, 08-316707, and 08-316708 filed on Nov. 27, 1996 including specification, claims, drawings and summary are incorporated herein by reference in its entirety.

We claim:

1. A third-order nonlinear optical material having vanadium oxide contained in a transparent organic polymer.

2. A third-order nonlinear optical material according to claim 1, wherein the absorption of said transparent organic polymer at an operating wavelength is not more than 10% of the absorption of the whole material.

3. A third-order nonlinear optical material according to claim 1, wherein said transparent organic polymer is an insulating polymer having an electric conductivity of not more than $10^{-10}$ S/cm.

4. A third-order nonlinear optical material according to claim 1, wherein said vanadium oxide is in the form of fine particles having a particle diameter of not more than 500 nm.

5. A third-order nonlinear optical material having a metal oxide contained in a transparent organic polymer, wherein said metal oxide is a polyacid.

6. A third-order nonlinear optical material having a thin film of the third-order nonlinear optical material set forth in claim 1 formed on a transparent substrate.

7. A method for the production of a third-order nonlinear optical material, comprising the steps of preparing a liquid having vanadium oxide and a transparent organic polymer dissolved or dispersed therein and distilling said liquid at a temperature of not more than 200° C. thereby expelling a solvent or a dispersion medium therefrom.

8. A third-order nonlinear optical material according to claim 1, wherein said transparent organic polymer is at least one member selected from the group consisting of polystyrene, polyethylene, acrylonitrile/styrene copolymer, polypropylene, polyesters, polyamides, polycarbonates, polymethyl methacrylate, polyacrylates, polyvinyl, methyl ether, polyethylene terephthalate, and polyvinyl chloride.

9. A third-order nonlinear optical material according to claim 8, wherein said transparent organic polymer is at least one member selected from the group consisting of polyamides, polycarbonates, and polystyrene.

10. A third-order nonlinear optical material according to claim 5, wherein said polyacid is at least one member selected from the group consisting of Si, V, Nb, Ta, Cr, Mo, and W.

11. A third-order nonlinear optical material according to claim 2, wherein the absorption of said polymer at an operating wavelength is not more than 3% of the absorption of the whole material.

12. A third-order nonlinear optical material according to claim 3, wherein said transparent polymer is an insulating polymer having an electric conductivity of not more than $10^{-12}$ S/cm.

13. A third-order nonlinear optical material according to claim 2, wherein said transparent polymer is an insulating polymer having an electric conductivity of not more than $10^{-10}$ S/cm.

14. A third-order nonlinear optical material according to claim 13, wherein said transparent polymer is an insulating polymer having an electric conductivity of not more than $10^{-12}$ S/cm.

15. A third-order nonlinear optical material according to claim 11, wherein said transparent polymer is an insulating polymer having an electric conductivity of not more than $10^{-10}$ S/cm.

16. A third-order nonlinear optical material according to claim 15, wherein said transparent polymer is an insulating polymer having an electric conductivity of not more than $10^{-12}$ S/cm.

17. A third-order nonlinear optical material according to claim 5, wherein said polyacid is in the form of fine particles having a particle diameter of not more than 500 nm.

18. A third-order nonlinear optical material having a thin film of the third-order nonlinear optical material set forth in claim 5 formed on a transparent substrate.

19. A method for the production of a third-order nonlinear optical material, comprising the steps of preparing a liquid having a polyacid and a transparent organic polymer dissolved or dispersed therein and distilling said liquid at a temperature of not more than 200° C. thereby expelling a solvent or a dispersion medium therefrom.

* * * * *